United States Patent [19]

Trent et al.

[11] 4,291,219

[45] Sep. 22, 1981

[54] APPARATUS FOR MAINTAINING ALIGNMENT OF A SHRINKING WELD JOINT IN AN ELECTRON-BEAM WELDING OPERATION

[75] Inventors: Jett B. Trent, Knoxville; Jimmy L. Murphy, Oak Ridge, both of Tenn.

[73] Assignee: The United States of America as represented by the United States Department of Energy, Washington, D.C.

[21] Appl. No.: 109,364

[22] Filed: Jan. 3, 1980

[51] Int. Cl.³ .................. B23K 15/00; G05D 3/12; B23K 37/04

[52] U.S. Cl. .................. 219/121 EY; 219/121 EC; 219/159; 318/632

[58] Field of Search .................. 219/121 EB, 121 EC, 219/121 ED, 121 EM, 121 EX, 121 EY, 121 LC, 121 LD, 121 LY, 124.4, 158, 159; 318/632

[56] References Cited

U.S. PATENT DOCUMENTS

| | | | |
|---|---|---|---|
| 3,255,336 | 6/1966 | Purcell | 219/159 X |
| 3,626,140 | 12/1971 | Peyrot | 219/121 EX X |
| 3,648,007 | 3/1972 | Oppermann et al. | 219/121 EY X |
| 3,648,140 | 3/1972 | Majek et al. | 219/124.4 X |
| 3,672,246 | 6/1972 | Prewett, Jr. et al. | 318/632 X |
| 3,754,178 | 8/1973 | Dormehl et al. | 318/632 X |
| 3,958,739 | 5/1976 | Wicker et al. | 219/121 EC X |
| 4,209,121 | 6/1980 | Newcomb | 219/121 EB X |

*Primary Examiner*—Gene Z. Rubinson
*Assistant Examiner*—Keith E. George
*Attorney, Agent, or Firm*—Earl L. Larcher; Stephen D. Hamel; Richard G. Besha

[57] ABSTRACT

The present invention is directed to an apparatus for automatically maintaining a shrinking weld joint in alignment with an electron beam during an electron-beam multipass-welding operation. The apparatus utilizes a biasing device for continually urging a workpiece-supporting face plate away from a carriage mounted base that rotatably supports the face plate. The extent of displacement of the face plate away from the base is indicative of the shrinkage occuring in the weld joint area. This displacement is measured and is used to move the base on the carriage a distance equal to one-half the displacement for aligning the weld joint with the electron beam during each welding pass.

5 Claims, 1 Drawing Figure

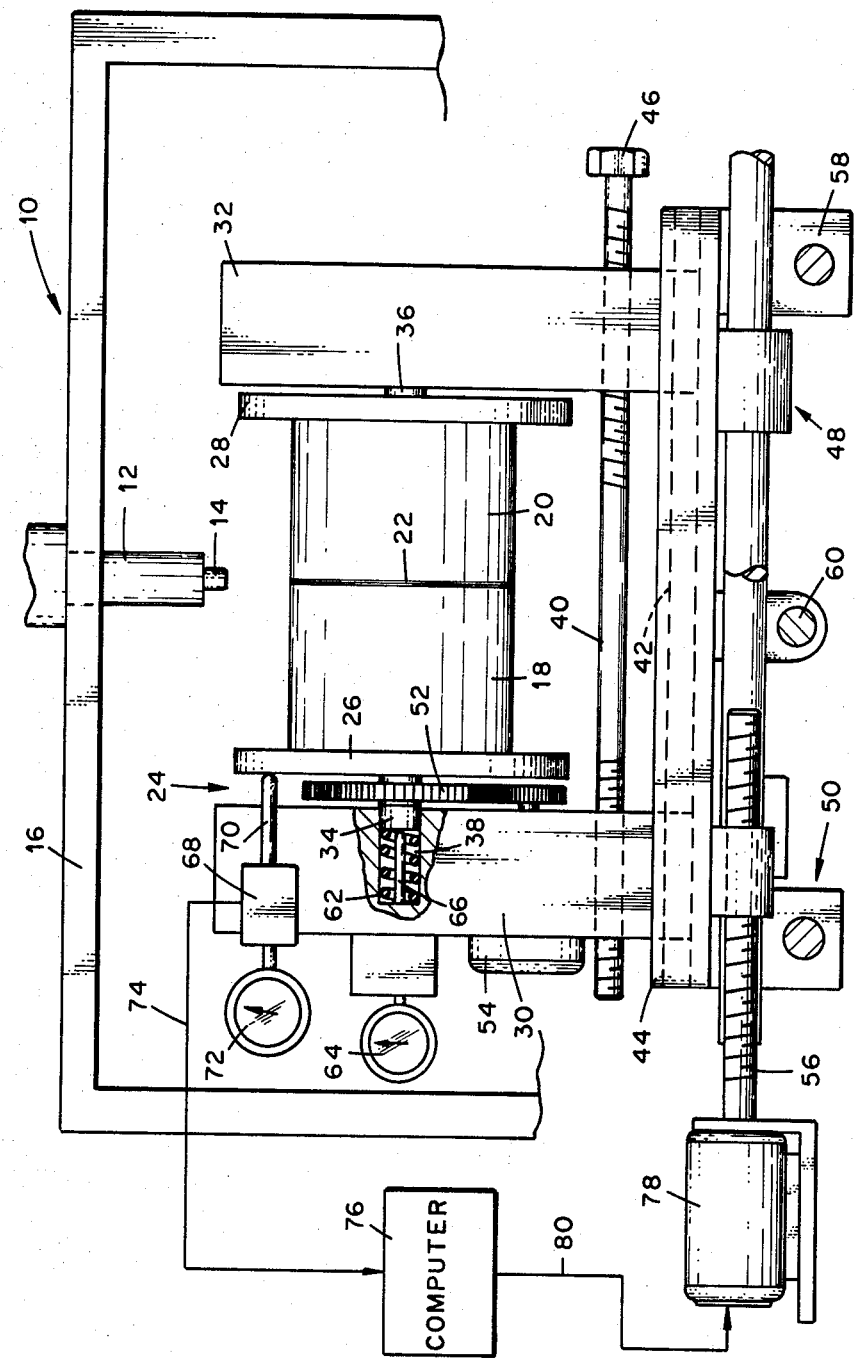

APPARATUS FOR MAINTAINING ALIGNMENT OF A SHRINKING WELD JOINT IN AN ELECTRON-BEAM WELDING OPERATION

This invention was made as a result of a contract with the U.S. Department of Energy.

BACKGROUND OF THE INVENTION

The present invention relates generally to electron-beam welding and more particularly to an apparatus usable in such a welding operation for maintaining the weld joint in alignment during a multipass-welding operation.

Welding workpieces by utilizing an electron gun for directing an electron beam onto a workpiece to provide sufficient localized heat to effect fusing of the workpiece metal has proven to be a very successful welding procedure for many applications. Electron-beam welding operations are achieved in a chamber under partial vacuum. This confinement of the workpiece normally necessitates that the alignment of the electron beam with the weld joint be made by the operator while looking into the chamber through a scaled viewing window. During multipass-welding operations, continuous positioning of the electron beam with the weld joint by either moving the workpiece or the electron beam gun is necessary for producing satisfactory welds. The misdirection of the electron beam onto the workpiece weld joint by as little as a few thousandths of an inch can seriously detract from the quality of the weldment.

A major problem in maintaining the alignment of the electron-beam gun with the weld joint during multipass-welding operations is due to the shrinkage of the workpiece and welds during each pass as caused by thermal cycling of the weld joint together with the melting of the workpiece material contiguous to the weld joint. The use of filler wire reduces but does not eliminate workpiece shrinkage.

As pointed out above, the electron beam is usually maintained in alignment with the weld joint by the operator during multipass-welding operations. Such alignment requires considerable operator skill and is a time-consuming operation which seriously detracts from the efficiency of the welding operation. Recent developments in welding equipment utilizing electron-beam multipass-welding operations with automatically fed filler wire welding material puts an even further burden upon the operator so as to render especially desirable the use of a mechanism capable of accurately aligning the weld joint with the electron beam during multipass-welding operations.

BRIEF SUMMARY OF THE INVENTION

Accordingly, it is the primary objective of the present invention to provide an apparatus for automatically and accurately maintaining the weld joint in alignment with an electron beam during multipass-welding operations to effectively compensate for shrinkage in the weld joints and workpiece during each welding pass. This objective is achieved by an apparatus which is capable of maintaining accurate alignment of the weld joint with respect to an electron beam during electron-beam welding operations. This apparatus comprises fixture means which support the fay surfaces of the workpieces to be joined together by the electron-beam welding mechanism in an abutting relationship. The fixture means include a first portion disposed contiguous to one of the workpieces and a second portion which supports the first portion in a relatively movable manner with respect thereto. A bias means is disposed intermediate the first and second portions for urging the first portion away from the relatively stationary second portion. Sensing means are utilized for measuring this displacement of the first portion away from the second portion. A suitable moving mechanism is coupled to the fixture means for displacing the latter and the workpieces carried thereby relative to the electron beam in response to a signal from the sensing means indicative of the displacement of the first portion for effecting the alignment of the weld joint with the electron beam.

The weld joint is maintained in an accurate alignment with the electron beam throughout multipass-welding operations so as to provide a high level of weld quality. Further, by utilizing the apparatus of the present invention the welding efficiency and the production rate can be greatly increased over those previously attainable. Further, by utilizing the apparatus of the present invention, welds which penetrate relatively deep into the workpieces can be provided with a high degree of weld integrity. Also, greater freedom in the selection of weld joint design is provided by employing the subject apparatus due to its capability of automatically maintaining the weld joint in alignment with the electron beam.

Other and further objects of the invention will be obvious upon an understanding of the illustrative embodiment about to be described or will be indicated in the appended claims, and various advantages not referred to herein will occur to one skilled in the art upon employment of the invention in practice.

DESCRIPTION OF THE DRAWING

In the accompanying drawing the FIGURE is a schematic illustration showing the apparatus of the present invention which is disposed within an electron-beam welding chamber and is utilized for automatically maintaining the alignment of the weld joint with the electron beam during a multi-pass welding operation.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

DETAILED DESCRIPTION OF THE INVENTION

With reference to the accompanying drawing an electron-beam welder is generally shown at 10 and is provided with a gun 12 including a cathode 14 for generating the electron beam utilized to sufficiently heat a selected location on the workpieces to effect the weld joint. The electron beam is generated within a chamber 16, partly broken away, in which a pressure-controlled environment at a vacuum of about $10^{-4}$ torr is maintained during the welding operation. The workpieces 18 and 20, shown as cylinders in the accompanying drawing, are positioned at a location underlying the gun 12 so that a weldment or weld joint 22 may be provided at the faying or abutting surfaces of the workpieces 18 and 20. The weld is normally a u-type butt weld in which a wire feed, not shown, may be utilized to provide most of the filler material. While the workpieces 18 and 20 are shown as being of cylindrical configuration for the purposes of this description, it is to be understood that the alignment apparatus of the present invention may be used with workpieces of other configurations, such as sheet material or other workpiece configuration commonly welded within an electron-beam welding assembly.

The alignment apparatus 24 of the present invention utilized for aligning the joint 22 at a location underlying the electron beam so as to effect the most desirable weld is shown comprising fixture means defined by face plates or chucks 26 and 28 which are respectively utilized to support the workpieces 18 and 20. The face plates 26 and 28 are, in turn, respectively supported by upstanding supports or base portions 30 and 32 which carry the face plates in such a manner as to permit the rotation thereof about an axis through centrally disposed shafts 34 and 36 which are affixed to the face plates and which extend into the base portions 30 and 32. The shaft 34 projects into a bore 38 containing bias means utilized in the workpiece alignment operation of the present invention as will be described in greater detail below. The workpieces are supported between the face plates 26 and 28 by employing any suitable mechanism such as a slide-lead screw assembly as shown. The lead screw 40 engages threaded passageways in the base portions 30 and 32 for displacing the base portions in opposing direction along a slide 42 on carriage 44. The rotation of the lead screw 40 may be achieved by affixing a nut 46 at one end thereof.

When the faying surfaces of the workpieces are positioned together, the welding assembly 24 can be placed in the chamber 16 under the electron-beam gun 12 at a desired location by the operator utilizing conventional aligning mechanisms. For example, the alignment of the workpieces may be achieved by displacing the face plate supported workpieces along x and y axes by using slide-lead screw assemblies as generally shown at 48 and 50. When in place under the electron-beam gun 12 the workpieces 18 and 20 may be rotated about the axes provided by the shafts 34 and 36 to bring the workpieces into the welding plane. This rotation may be in any suitable manner such as by employing a suitable gear-reduction assembly generally shown at 52 driven at a selected speed by motor 54.

As pointed out above, the initial alignment of the workpieces under the electron-beam gun 12 when the workpiece supporting assembly is within the welding chamber may be achieved by positioning the workpieces in the x and y planes by conventional machine-slide mechanisms. As shown in the accompanying drawing, the carriage 44 utilized for supporting the bases 30 and 32 may be displaced by a lead screw 56 along the x axis while a y axis carriage 58 having a lead screw 60 is utilized for displacing the workpieces along the y axis.

In a multipass-welding operation shrinkage occurs in the joint area due to thermal activity at the weld and the loss of workpiece material. This shrinkage must be compensated for by realigning the weld joint 22 after every pass to assure that the weld is occurring at the desired location. In accordance with the present invention, a mechanism is provided for automatically compensating for such shrinkage by the selective displacement of the workpieces along the x axis, as shown, to maintain alignment of the weld joint 22 under the electron-beam gun 12. To effect this alignment, a bias mechanism is utilized to continually urge the face plate 26 toward face plate 28. As shown, the face plate 28 is maintained in a fixed or stationary position while the face plate 26 is displaceable by the bias means to provide a mechanism for determining the extent of movement or shrinkage in the weld joint area. To effect this movement of the face plate 26 towards face plate 28, the bore 38 in the base portion 30 is of a length considerably greater than that required for the shaft 34. The volume or cavity beyond the distal end of the shaft 34 contains a compression spring 62 which bears against the end of the shaft 34. When the base portions 30 and 32 are moved toward one another by the rotation of the lead screw 40 during the mounting of the workpieces, the spring 62 is compressed by the end shaft 34. By so compressing the spring 62 the face plate 26 is continually urged by the spring 62 in a direction towards the face plate 28 so that any shrinkage occurring in the joint area will result in the movement of the face plate 26. The spring 62 is preloaded at a sufficient value so as to force the face plate 26 toward the opposite face plate. Normally, an initial pressure loading of about 500 pounds upon the spring 62 is satisfactory for practicing the present invention. The extent of this loading may be monitored by a suitable gage 64 having a probe 66 contacting the end of the shaft 34.

The movement of the workpieces together with the displacement of the face plate 26 by the spring 62 is directly indicative of the shrinkage in the weld area. To measure this shrinkage, a suitable sensing mechanism is utilized to measure the displacement of the face plate 26 away from the base portion 30. As shown in the drawing, a sensor suitable for such measurements is a linear velocity displacement transducer (LVDT) 68 which may be readily attached to the base 30 by a suitable mount and which is provided with a probe 70 extending from the LVDT 68 to the face plate 26 for providing the necessary measurement of the displacement of the face plate 26 for determining the weld area shrinkage. A visual indication of this displacement may be readily provided by attaching a suitably marked gage 72 to the LVDT. A signal from the LVDT 68 is conveyed via lead 74 to a computer or micro-processor or any other suitable system generally shown at 76 in which the signal can be processed to provide operational control of a lead screw drive motor. The signal, once received by the computer or the like 76, is processed and utilized to operate drive motor 78 via lead 80 for rotating lead screw 56 to carriage 44 in a selected direction for automatically aligning the weld joint 22 under the electron-beam gun 12. The drive motor 78 receives a signal indicative of the displacement of the face plate 26 due to weld area shrinkage. The displacement of the carriage 44 is equal to one-half the displacement of the face plate 26 so as to precisely align the weld joint 22 with the electron-beam gun 12 after each welding pass.

In a typical application of the apparatus of the present invention, two cylinders of uranium metal having a wall thickness of 0.6 inch were joined with an electron beam weld joint which required sixteen weld passes using uranium metal filler wire. The shrinkage of the weld joint varied during each welding pass with a total shrinkage of 0.046 inch. This shrinkage was compensated for during each welding pass by the subject apparatus so that the weld joint was provided at precisely the location desired.

It will be seen that the apparatus of the present invention provides a mechanism which accurately measures the weld area shrinkage and utilizes this measurement for accurately and automatically aligning the weld seam with the electron beam for each pass of a multipass-welding operation. Utilization of this system in an electron-beam welding operation significantly increases the productivity of the machine.

What is claimed is:

1. Apparatus for maintaining accurate alignment of a weld joint with respect to an electron beam due to shrinkage in the weld joint area during a multipass, electron-beam welding operation comprising, fixture means for supporting the fay surfaces of workpieces to be joined together by electron-beam welding in an abutting relationship, said fixture means including a first portion thereof disposed contiguous to one of said workpieces, a second portion of said fixture means spaced from said workpiece by said first portion and supporting said first portion in a relatively movable manner with respect thereto, bias means intermediate to and bearing against said first portion and said second portion for urging said first portion away from said second portion and towards said workpieces, sensing means for measuring the displacement of said first portion away from said second portion in a direction towards said workpiece upon said shrinkage in the weld joint area, and moving means coupled to said fixture means for displacing the latter in response to a signal from said sensing means indicative of said displacement of said first portion for effecting the said alignment of the weld joint.

2. The apparatus claimed in claim 1, wherein said bias means comprises a compression spring carried by said second portion and bearable against said first portion for urging the latter away from said second portion.

3. The apparatus claimed in claim 2 including a further portion of said fixture means spaced from said first portion, and means for moving said further portion and said first portion along a common plane for supporting said workpieces therebetween and for compressing said spring by displacing said first portion towards said second portion.

4. The apparatus claimed in claim 3 wherein said further portion is supported by a still further portion of said fixture means, said second portion and said still further portion are attached to a common carriage means, wherein said moving means comprises a motor-driven lead screw engaged with said carriage means for displacing said second portion and said still further portion along said carriage means, and wherein said signal actuates the motor of said motor-driven lead screw to displace the carriage means a distance equal to one-half the measured displacement of said first portion from said second portion.

5. The apparatus claimed in claim 3 wherein said first portion and said further portion are rotatably supported by said second portion and said still further portion, wherein a shaft projects from said first portion and is received in a cavity in said second portion, and wherein said spring is disposed in said cavity and bears against an end surface of said shaft.

* * * * *